(12) United States Patent
Anderson et al.

(10) Patent No.: US 7,505,362 B2
(45) Date of Patent: Mar. 17, 2009

(54) METHOD FOR DATA REGULARIZATION FOR SHOT DOMAIN PROCESSING

(75) Inventors: John E. Anderson, Houston, TX (US); Anatoly I. Baumstein, Houston, TX (US); Mohamed T. Hadidi, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 11/212,063

(22) Filed: Aug. 24, 2005

(65) Prior Publication Data
US 2006/0098529 A1 May 11, 2006

Related U.S. Application Data

(60) Provisional application No. 60/625,897, filed on Nov. 8, 2004.

(51) Int. Cl.
G01V 1/28 (2006.01)
(52) U.S. Cl. .......................................................... 367/53
(58) Field of Classification Search .................. 367/53; 702/17
See application file for complete search history.

(56) References Cited

U.S. PATENT DOCUMENTS

| | | | | |
|---|---|---|---|---|
| 4,878,204 A | * | 10/1989 | Black et al. | 367/53 |
| 4,980,866 A | * | 12/1990 | Wang et al. | 367/52 |
| 5,285,422 A | * | 2/1994 | Gonzalez et al. | 367/53 |
| 5,544,126 A | * | 8/1996 | Berryhill | 367/52 |
| 5,583,825 A | * | 12/1996 | Carrazzone et al. | 367/31 |
| 5,671,136 A | * | 9/1997 | Willhoit, Jr. | 702/18 |
| 5,719,822 A | * | 2/1998 | Wang | 367/53 |
| 5,924,049 A | * | 7/1999 | Beasley et al. | 702/17 |
| 5,970,023 A | * | 10/1999 | Chambers et al. | 367/63 |
| 6,418,379 B1 | * | 7/2002 | Bloor et al. | 702/17 |
| 6,430,510 B1 | * | 8/2002 | Thomas et al. | 702/14 |
| 6,545,944 B2 | * | 4/2003 | de Kok | 367/56 |
| 6,735,527 B1 | * | 5/2004 | Levin | 702/14 |
| 7,149,630 B2 | * | 12/2006 | Abma | 702/17 |
| 7,197,399 B2 | * | 3/2007 | Matson et al. | 702/17 |
| 2005/0111702 A1 | * | 5/2005 | Kelly | 382/109 |

OTHER PUBLICATIONS

Malcolm et al. The applicability of dip moveout/azimuth moveout in the presence of caustics. Geophysics. vol. 70. No. 1 (Jan.-Feb. 2005). pp. S1-S17.*

Abma, R. and Kabir N. (2003) "Comparisons of interpolation methods in the presence of aliased events", Expanded Abstracts, *SEG* (2003), pp. 1909-1912.

Beasley, C. J. and Klotz, R. (1992) "Equalization of DMO for Irregular Spatial Sampling", *54th Mtg. Eur. Assoc. of Expl. Geophys.*, Paris, France, 1992, pp. 232-233.

(Continued)

*Primary Examiner*—Deandra M Hughes (57) ABSTRACT

Method for interpolating aliased seismic data to generate shot records at regular shot points. The method involves sorting the data into common offsets to obtain the finer sampling in the common-offset domain, then using DMO to transform the data to zero offset to eliminate azimuth and offset variations, from which densely sampled shot records are reconstructed by an efficient Log-Stretch Inverse Shot Record DMO. The method has ready application to techniques that benefit from input data that are regularly and densely sampled, such as 3-D surface related multiple elimination and shot record wave equation migration.

23 Claims, 9 Drawing Sheets

OTHER PUBLICATIONS

Biondi B. et al. (1998) "Azimuth moveout for 3-D prestack imaging," *Geophysics* 63, No. 2, Mar.-Apr. 1998, pp. 574-588.

Black, J. L. et al. (1993) "True-amplitude imaging and dip moveout," *Geophysics*, 58, No. 1, Jan. 1993, pp. 47-66, 8 Figs., 3 Tables.

Brigham, E. O. (1974) *The Fast Fourier Transform*, Prentice-Hall.

Dragoset, W. H. et al. (1998) "Some Remarks on Surface Multiple Attenuation", *Geophysics*, 63, No. 2, Mar.-Apr. 1998, pp. 772-789, 15 Figs.

Dragoset, Bill (1999) "A Practical Approach to Surface Multiple Attenuation", *The Leading Edge*, Jan. 1999, pp. 104-108.

Hadidi, M. T. et al. (2002) "Surface-Related Multiple Elimination on Wide-Tow Marine Data," *The Leading Edge*, Aug. 21, 2002, pp. 787-790.

Stolt, R. H. (2002) "Seismic Data Mapping and Reconstruction", *Geophysics*, 67, No. 3, May-Jun. 2002, pp. 890-908, 4 Figs., 1 Table.

* cited by examiner

FIG. 14

METHOD FOR DATA REGULARIZATION FOR SHOT DOMAIN PROCESSING

This application claims the benefit of U.S. Provisional Patent Application No. 60/625,897 filed on Nov. 8, 2004.

FIELD OF THE INVENTION

This invention relates to the field of geophysical prospecting and, more particularly, to seismic data processing. Specifically, the invention is a method for regularization of seismic data for purposes that include multiple suppression and shot record migration.

BACKGROUND OF THE INVENTION

In seismic data acquisition, the seismic source is typically positioned at a selected shot location, and the seismic reflections of the shot are detected (the "shot record") by receivers also located at selected locations. Then, the source and receivers are moved to different locations and the process repeated, and in this manner a seismic survey is taken of a selected subterranean region. Ideally for many seismic processing and interpretation objectives, the source and receiver locations would lie on a uniformly and densely sampled grid but this is difficult to achieve in common industry practice for many reasons including surface obstructions, currents, cable feathering, and acquisition cost. Survey economics mandate that the spacings be as large as will still yield the required detail in the survey results. The desired seismic reflections are wavefields that reflect once from a subterranean interface between regions with different acoustic properties (such as the upper surface of a petroleum reservoir), and then travel back to the surface to be detected by a receiver. These desired data are often obscured by undesired multiple reflections of seismic energy. Multiple suppression techniques exist for reducing this noise problem. Migration is a seismic data processing technique for moving the reflection events in recorded data to their true locations, which is necessary for non-horizontal subsurface reflectors.

Certain advanced seismic processing techniques such as three-dimensional surface-related multiple elimination ("3D SRME") and shot-record wave-equation migration ("SR-WEM") work best if input data were regularly and densely sampled in the seismic survey that generated the data or as reconstructed by some interpolation technique. In particular, 3D SRME requires dense sampling of both shots and receivers, while SRWEM efficiency is a function of the number of shot records in the data set. Current marine acquisition geometries do not provide the data suitable or optimal for either one of the above processing algorithms. In the case of 3D SRME, shot (and to a lesser degree, streamer, i.e., receiver) spacing is too coarse for the algorithm to predict 3-D multiples correctly.

Currently, a number of interpolation techniques exist that attempt to interpolate missing data and to place irregularly sampled data on a fixed grid. Spatial aliasing, i.e., insufficient (less than two points per wavelength) sampling of data along a space axis, is a universal difficulty affecting all existing methods. Aliasing distortion can be seen in any motion picture where the wheels of a moving car are shown. One frame shows a wheel in a certain rotational position, but the next frame may show the wheel more than one full revolution later for example, or a little less than one revolution later, causing the non-physical effect so familiar to moviegoers in which wheel rotation is inconsistent with car motion. More frames per second would reduce this problem, and interpolation between existing frames is a possible way to achieve the same result. Although existing seismic data interpolation methods can interpolate data "beyond aliasing" under certain assumptions, their performance degrades as shot and receiver sampling become coarser and aliasing becomes more severe. Given that typical shot intervals in marine acquisition are hundreds of meters in the crossline (transverse to the boat movement) direction, there is currently no effective way of interpolating data to make it suitable for 3D SRME, which requires a data spacing of roughly 10-20 meters. Similarly, there is no known method capable of reconstructing the 360-degree receiver coverage that would be ideal for SRWEM.

Conceptually, if the subsurface properties (i.e., seismic wave velocities and densities) are known, one should be able to reconstruct seismic data at arbitrary locations through the well-known process of modeling. However, this is not easily achievable in practice since subsurface properties are typically not known with sufficient accuracy. A more practical approach would be to first migrate seismic data using an approximate velocity field and then de-migrate the image to emulate the desired surface acquisition. While migration-demigration would provide very accurate results even in the most complex geologic settings, the cost incurred would be prohibitive given computer resources currently available in the industry.

A more cost-effective approach is to map data to zero offset with the help of Dip Move-Out ("DMO") and reconstruct the desired shot-receiver geometry by performing Inverse Common Offset DMO. (DMO processing is a widely known seismic processing operation to correct for the fact that, for a dipping reflection, the component traces of a common-midpoint gather do not involve a common reflecting point.) Although this approach makes certain simplifying assumptions about wavefield propagation, it has been used successfully to regularize marine data and serves as the basis of a technique known as Azimuth Move-Out ("AMO"); see Biondi, Fomel and Chemingui, "Azimuth moveout for 3-D prestack imaging," *Geophysics* 63, 574-588 (1998). AMO is an efficient way of rotating irregular pre-stack data to a single common azimuth and offset. The key issue in the case of the shot record interpolation problem is that the output shot records comprise all possible azimuths and offsets, with nearly continuous azimuth angle variation between 0 and 360 degrees. If existing technology were applied, it would have been necessary to perform thousands of AMO runs to reconstruct all possible azimuths and offsets that may be present in a shot record, once again leading to a prohibitively expensive approach. Stolt provides an alternative in the form of a general data reconstruction method that can map arbitrary input shot geometry into a regular output shot geometry. ("Seismic data mapping and reconstruction," *Geophysics* 67, 890-908 (2002).) The one-step shot continuation method proposed by Stolt can be very costly if applied to a conventional marine survey in order to reconstruct densely spaced shot records with dense receiver coverage, as required, for example, for 3D SRWEM.

A good overview of the existing interpolation methods can be found in "Comparisons of interpolation methods in the presence of aliased events" by R. Abma and N. Kabir, *Expanded Abstracts*, SEG (2003).

SUMMARY OF THE INVENTION

The present invention is a method for taking input seismic data that have been acquired on a non-uniform coarsely sampled grid that may include only a limited range of source-to-receiver azimuths and transforming those data into an equivalent set of data on a finely sampled regular and dense grid including all source-to-receiver azimuths. The new data are equivalent in the sense that reflection events associated with a single subsurface interface in the new data set would be accurately mapped to the same subsurface locations by a migration code as the corresponding data in the input data set. The new data are suitable for use in advanced seismic processing techniques that require regularly and densely sampled input data, such as 3D SRME and 3D Shot Record migration.

In one embodiment the invention is a method for reconstructing shot records from a three-dimensional seismic survey (including a nominal 2-D survey with closely spaced sail lines), said method comprising: (a) sorting the seismic data into common-offset gathers; (b) DMO-processing (including divergence correction and normal moveout) the data to map the data to zero offset; (c) sorting the mapped data into common mid-point gathers; (d) applying temporal log-stretch and Fourier transforms to the common mid-point gathers; (e) forming input zero-offset shot gathers at desired locations for reconstructed shot gathers by selecting data traces from the common-midpoint gathers; (f) applying spatial log-stretching and Fourier transforms to the input zero-offset shot gathers; (g) designing an operator having a kinematics (shape) described by the following equations:

$$\{(2h_{0x}/h_x)-1\}^2+(t_0/t)^2=1$$

$$h_y = h_x h_{0y}/h_{0x}$$

where $t_0$ and $t$ are time, and $\vec{h}_0=(h_{0x}, h_{0y})$ and $\vec{h}=(h_x, h_y)$ denote displacements (offsets) relative to shot location, for the input zero-offset shot record and the reconstructed shot record, respectively; (h) applying temporal and spatial log-stretch and Fourier transforms to said operator's impulse response; (i) multiplying the stretched and Fourier-transformed input zero-offset shot gathers by the stretched and Fourier-transformed impulse response, sample by sample; (j) inverse Fourier transforming and inverse log stretching the results from the previous step to produce reconstructed shot records; and (k) performing inverse normal moveout and inverse divergence compensation on the reconstructed shot records.

In some embodiments of the invention, each input zero-offset shot gather is formed by: (a) selecting a shot location in the desired reconstructed configuration; (b) selecting a location on a discretized grid selected for performing numerical implementation of said shot reconstruction method; (c) selecting a trace from the common-midpoint gather located at the selected grid location; (d) placing said selected trace at said selected grid location; and (e) repeating steps (b)-(d) for a pre-determined number of other grid locations.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present inventive method overcomes the difficulties of interpolating aliased data by using a dual-domain approach. While sampling in a shot or receiver record may be coarse, sampling in the common offset domain is typically much finer. (In the "common-offset domain," seismic data is sorted by offset, i.e., source-receiver spacing.) The present invention uses a two-step approach with forward common-offset DMO followed by an efficient Log-Stretch Inverse Shot Record (ISR) DMO, a technique that is disclosed below. The two step approach provides the required flexibility in choosing locations and geometries of the reconstructed (i.e., interpolated) shots. ISR DMO is able to start with a zero offset volume of data produced by forward DMO and reconstruct all azimuths in a shot record at once. It can also reconstruct shots at arbitrary spatial locations. The present invention includes both a mathematical formulation and an effective computational implementation of ISR DMO.

As illustrated in the flow-chart of FIG. 1, the basic steps in one embodiment of the present invention's method for regularizing seismic data, i.e., interpolating the data to a regular grid, fine enough for subsequent processing needs, are as follows:

At step 11, input shot records are sorted into common offsets. Spatial sampling in the common offset domain is typically much finer than the original sampling in the shot domain. At step 12, Dip Move Out (DMO) (including divergence correction and normal moveout (NMO)) is applied. (See, for example, Black, J. L., Schleicher, K. L. and Zhang, L., "True-amplitude imaging and dip moveout," Geophysics, Soc. of Expl. Geophys. 58, 47-66 (1993).) This step maps all data to zero offset, thus eliminating azimuth and offset variations. Optionally, Equalized DMO ("EQ DMO",) can be applied to compensate for fold variation in common offset cubes. (See, for example, Beasley, C. J. and Klotz, R., "Equalization of DMO for irregular spatial sampling," 54th Mtg.: Eur. Assn. of Expl. Geophys., 232-233 (1992).) As used herein, including the appended claims, the term DMO will include all variations of Dip Move Out, including EQ DMO.

At step 13, data are sorted into common midpoint ("CMP") gathers. CMP gathers are interpolated to fine offset spacing. Note that after DMO, CMP gathers are typically flat and not aliased, making interpolation possible. This step is optional and may be skipped if interpolation is not necessary.

Figure 2:
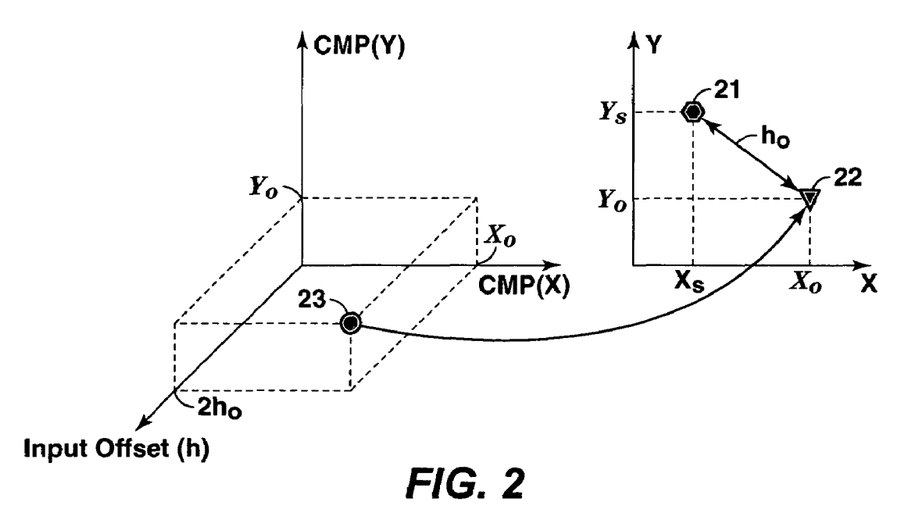
FIG. 2 illustrates how input zero-offset shot gathers are formed at the desired shot locations.

At step 14, desired locations for reconstructed shot gathers are chosen and zero-offset shot gathers for input to ISR DMO (hereinafter sometimes referred to as "input zero-offset shot gathers") are formed in the manner illustrated in FIG. 2: For an output shot gather 21 centered at position (Xs, Ys), the trace 22 placed at grid position ($X_0, Y_0$) is obtained by selecting a trace 23, preferably with an (original) offset $2h_0$ (where $h_0$ is the distance from (Xs,Ys) to ($X_0,Y_0$)), from the CMP gather (formed in step 13) located at ($X_0,Y_0$). The idea behind the inventive approach is that in the absence of subsurface dips, ISR DMO moves each trace from its midpoint to the output receiver location. Since the dips are not known a-priori, the input to ISR DMO is formed by choosing traces that are the most appropriate for a subsurface consisting of flat layers. The resulting reconstruction procedure has been found to be accurate for all dips and robust with respect to NMO velocity errors. In a similar manner, traces are placed at other grid locations within a selected distance from the shot location. For example, one might select all grid locations within a distance from the shot location equal to a factor of 0.75 to 1 times the maximum offset in the desired reconstructed (output) gather.

With the data now usefully re-sorted, it remains to reconstruct dipping reflection events correctly. At step 15, a new algorithm, which may be called Inverse Shot Record DMO (ISR DMO) is applied to the output of step 14 to reconstruct shot records. ISR DMO is described by the following integral formula:

$$P_n(t, \vec{h}) = \int\int e^{-i(\omega_n t - \vec{k}_h \vec{h})} d\omega_n d\vec{k}_h$$
$$\int\int e^{i(\omega_n t_n(t_0,\vec{h}_0) - \vec{k}_h \vec{h}_n(t_0,\vec{h}_0))} P_0(t_0, \vec{h}_0) J(t_0, \vec{h}_0) dt_0 d\vec{h}_0,$$

where $$J = \frac{2\rho(1-2\rho)^2}{\gamma(1-6\rho)}; \vec{h}_n = \frac{4\rho-2}{4\rho-1}\vec{h}_0; t_n = t_0\frac{\rho}{\gamma}(1-2\rho); \gamma = \frac{\vec{k}_h\vec{h}_0}{\omega_n t_0};$$

and $$\rho\sqrt{1-4\rho} = \gamma$$

and where $P_0(t_0, \vec{h}_0)$ is a zero-offset shot record formed in the previous step; $P_n(t, \vec{h})$ is a reconstructed shot record; $t_0$ and t are the input and output time respectively; $\vec{h}_0=(h_{0x},h_{0y})$ and $\vec{h}=(h_x,h_y)$ denote displacements (offsets) measured from the shot location for the input zero-offset shot and reconstructed shot records respectively. In a more general formulation of the preceding integral operator, J is a weighting factor chosen to preserve amplitude consistency between input and output data, and the particular expression given above for J is but one of many possible options.

The above formulas can be combined to obtain the following equations describing the shape (kinematics) of the ISR DMO operator:

$$\begin{cases} \left(\frac{2h_{0x}}{h_x} - 1\right)^2 + \left(\frac{t_0}{t}\right)^2 = 1 \\ h_y = h_x \frac{h_{0y}}{h_{0x}} \end{cases}.$$

Figure 3:
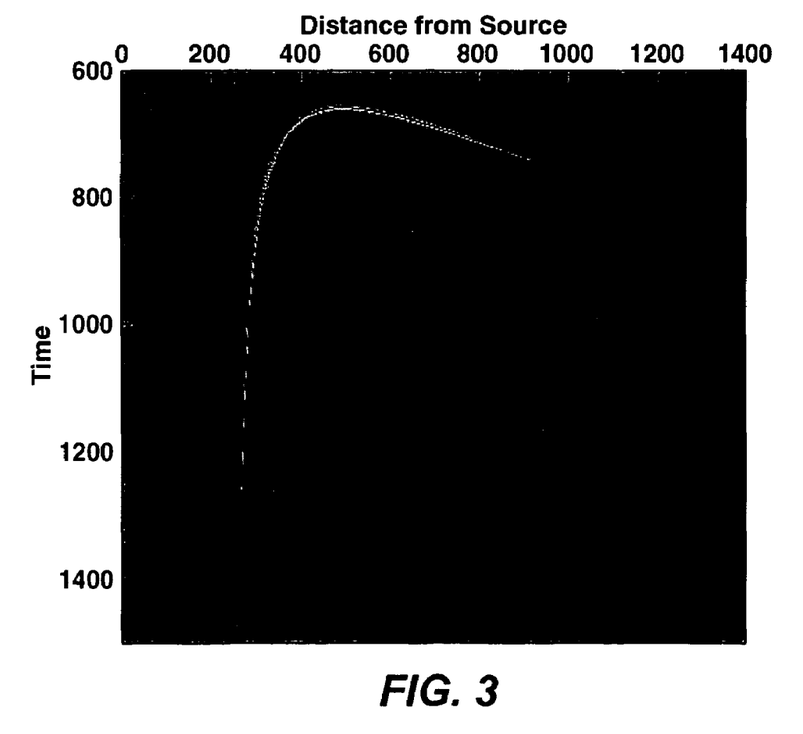
FIG. 3 illustrates the impulse response for an Inverse Shot Record (ISR) DMO operator of the present invention.

Other ISR DMO operators besides the particular formulation stated above but with the same kinematic expression will work in the present invention, but the amplitude behavior of such other operators may be inferior. A plot of t vs. h, where $h=\sqrt{h_x^2+h_y^2}$, is shown in FIG. 3 and represents the impulse response of the ISR DMO operator.

At step 16, inverse NMO and inverse divergence compensation are performed.

ISR DMO as described above in step 15 is computationally expensive. Therefore, the present inventive method features the Fourier transform in the log-stretch domain. Preferably, the Fourier transform is the Fast Fourier Transform (FFT). See, for example, E. O. Brigham, *The Fast Fourier Transform*, Prentice-Hall (1974). This formulation makes use of the fact that the operator becomes spatially and temporally invariant after the log-stretch transformation. This transformation transforms from the time/offset domain to the $\tau, \vec{\eta}$ domain through the following equations:

$$h_{0x} = h_{1x}\exp\frac{\eta_{0x}}{h_{1x}}; h_{0y} = h_{1y}\exp\frac{\eta_{0y}}{h_{1y}}$$
$$h_x = h_{1x}\exp\frac{\eta_x}{h_{1x}}; h_y = h_{1y}\exp\frac{\eta_y}{h_{1y}}$$
$$t = t_1\exp\frac{\tau}{t_1}; t_0 = t_1\exp\frac{\tau_0}{t_1},$$

Figure 4:
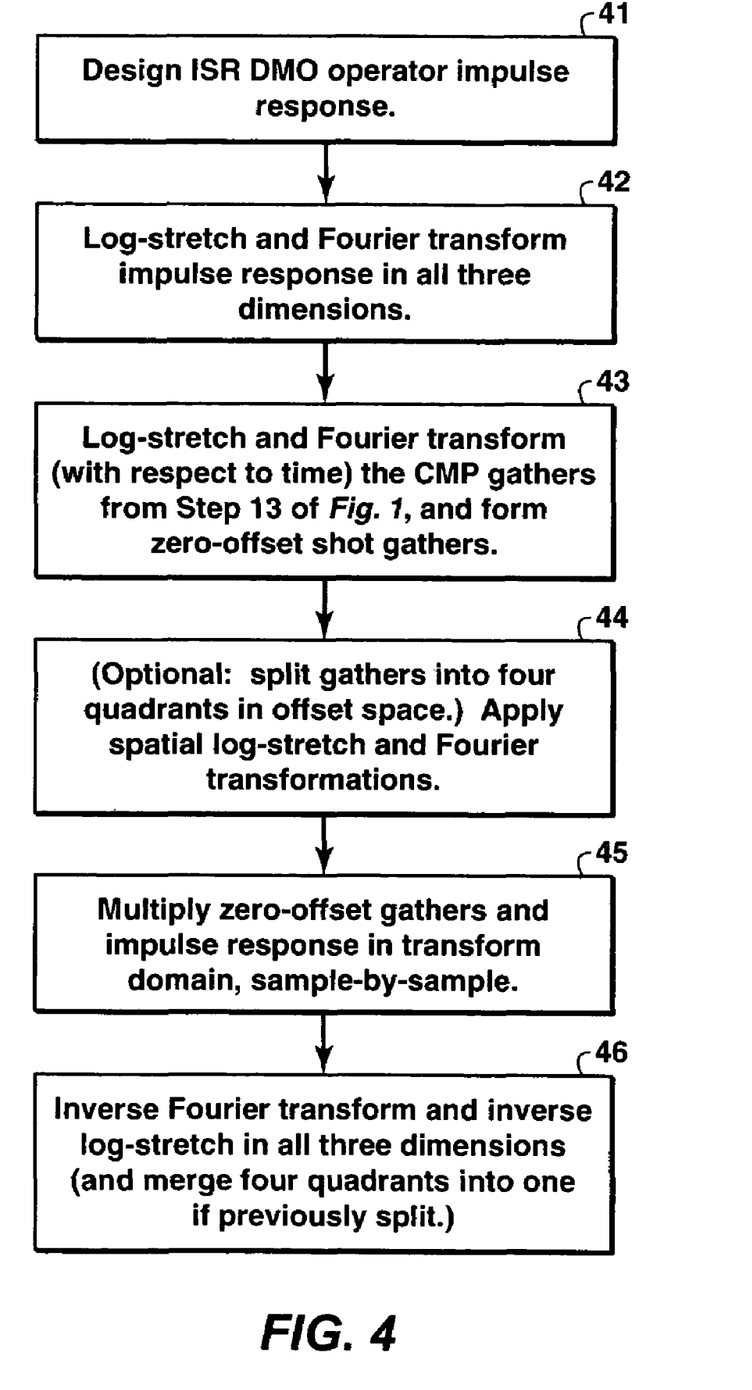
FIG. 4 is a flow chart of the basic steps for an efficient alternative formulation of the ISR DMO operator.

The kinematic expression for the impulse response using the new variables becomes:

$$\begin{cases} \left(2\exp\frac{\eta_{0x}-\eta_x}{h_{1x}} - 1\right)^2 + \exp 2\frac{\tau_0-\tau}{t_1} = 1 \\ \eta_{0y} - \eta_y = \frac{h_{1y}}{h_{1x}}(\eta_{0x}-\eta_x) \end{cases},$$

where $t_1$ and $\vec{h}_1=(h_{1x}, h_{1y})$ are the minimum time and offset of interest respectively. The immediately preceding two expressions imply that both shape (defined by the first equation) and azimuth (given by the second equation) of the operator in the new variables $(\tau, \vec{\eta})$ are temporally and spatially invariant, i.e., they are independent of $\tau_0$ and $\vec{\eta}_0$. Therefore ISR DMO can be efficiently implemented as a convolution of the input data with a pre-computed impulse response, as described below. In one embodiment of the invention, the following steps are performed, as shown in FIG. 4.

In step 41, the ISR DMO operator (impulse response) $P_n(t, \vec{h}; t_1, \vec{h}_1)$ is designed by setting $P_0(t_0, \vec{h}_0)$ equal to $\delta(t_1-t_0, \vec{h}_1-\vec{h}_0)$ in the integral formulation of step 15:

$$P_n(t,\vec{h};t_1,\vec{h}_1) = \iint e^{-i(\omega_n t - \vec{k}_h \vec{h})} e^{i(\omega_n t_n(t_1,\vec{h}_1) - \vec{k}_h \vec{h}_1))} J(\omega_n, \vec{k}_h; t_1, \vec{h}_1) d\omega_n d\vec{k}_h$$

This is a key step in the shot reconstruction process in this embodiment of the present invention. Since the ISR DMO operator is temporally and spatially invariant in the log-stretch domain, it is sufficient to compute it for just one pair $(t_1, \vec{h}_1)$, where $t_1$ and $\vec{h}_1$ are once again the minimum time and offset of interest respectively. In step 42, the operator impulse response is log-stretched and Fourier transformed. The numerical implementation is as follows:

For each pair of the output Fourier coordinates $(\omega_n, k_{hx})$, one first computes $$\gamma = \frac{k_{hx} h_{1x}}{\omega_n t_1}$$

and the corresponding $\rho$, $$J = \frac{2\rho(1-2\rho)^2}{\gamma(1-6\rho)},$$

$$h_{nx} = \frac{4\rho-2}{4\rho-1} h_{1x}, \text{ and } t_n = t_1 \frac{\rho}{\gamma}(1-2\rho).$$

The integrand $e^{i(\omega_n t_n(t_1,h_{1x}) - k_{hx} h_{nx}(t_1,h_{x1}))} J(t_1, h_{1x})$ is evaluated.

The integrand is inverse Fourier transformed (using an FFT) to obtain a 2D impulse response $P_{2D}(t, h_x; t_1, h_{1x})$ Numerical log-stretching is performed and $P_{2D}^{log}(\tau, \eta_x)$ is obtained.

The log-stretched 2D impulse response $P_{2D}^{log}(\tau, \eta_x)$ is rotated to its correct position in 3D according to the following formula:

$$P_{3D}^{log}(\tau, \eta_x, k_{\eta_y}) = \exp\left(-ik_{\eta_y} \frac{h_{1y}}{h_{1x}} \eta_x\right) P_{2D}^{log}(\tau, \eta_x)$$

$P_{3D}^{log}(\tau, \eta_x, k_{\eta_y})$ is Fourier transformed in $(\tau, \eta_x)$ to obtain a log-stretched Fourier-transformed 3D ISR DMO operator $P_{3D}^{log}(\omega_n, k_{\eta_x}, k_{\eta_y})$ In step 43, input zero-offset shot gathers are formed by applying the temporal log-stretch and Fourier transforms to the results of step 13 above (FIG. 1), followed by step 14 above.

In step 44, the spatial log-stretch transform followed by the spatial FFT are applied to the input zero-offset shot gather formed in step 43. Because the ISR DMO operator is invariant with respect to the sign of offset, it is preferable to split the input zero-offset shot gather into four quadrants (corresponding to the four possible combinations $(h_x>0, h_y>0), (h_x<0, h_y>0), (h_x>0, h_y<0), (h_x<0, h_y<0)$), and apply the spatial log-stretch transform, followed by the spatial FFT to each quadrant.

In step 45, the Fourier transformed zero-offset shot gathers from the previous step and the impulse response from step 41 are multiplied sample by sample. A "sample" refers to the seismic data representing a discrete cell of dimensions (in physical space) $\Delta x$ by $\Delta y$ by $\Delta t$ into which the subsurface is partitioned for purposes of performing the numerical calculations necessary to solve the preceding equations. However, since the data have been log-stretched and Fourier transformed, a sample represents a cell in the $(\omega_\tau, \vec{k}_\eta)$ space, where $\omega_\tau$ is the Fourier-domain variable corresponding to the log-stretched time $\tau$; $\vec{k}_\eta$ is the Fourier domain variable corresponding to the log-stretched spatial coordinate $\vec{\eta}$. (In seismic data volumes, the vertical dimension is often measured by the traveltime of the seismic wave.) In step 46, the results are inverse Fourier transformed, and inverse log-stretched in all three dimensions, and these results from all four quadrants are merged into one output shot gather (in those embodiments of the invention in which the input zero-offset shot gather is split into four quadrants in step 44).

The approach outlined in FIG. 4 is very efficient because the first two steps are typically performed only once. This occurs because the output shot geometry typically does not vary across the survey. However, one could vary the crossline aperture (extent) of reconstructed shots to match the anticipated needs of 3D SRME. 3D SRME may require different crossline aperture depending on the amount of crossline dip present in the data. The present invention will still have useful applicability to such variations.

Sampling requirements in the numerical log-stretching (steps 42 and 43) dictate that $$\Delta\tau \le \frac{t_1}{t_{max}} \Delta t,$$

where $\Delta\tau$ is the sampling in the log-stretch domain, $t_1$ and $t_{max}$ are the minimum and maximum times of interest, and $\Delta t$ is the sampling of the input data. As a result the number of samples required to represent a trace in the log-stretch domain is given by $$N_\tau = \frac{\tau_{max}}{\Delta\tau} = \frac{t_1 \log \frac{t_{max}}{t_1}}{\Delta\tau} \ge \frac{t_1 \log \frac{t_{max}}{t_1}}{\frac{t_1}{t_{max}} \Delta t} = N_t \log \frac{t_{max}}{t_1}.$$

Similarly, the number of samples after the log-stretching in the spatial domain can be computed as $$N_{\eta_x} \ge N_{h_x} \log \frac{h_{xmax}}{h_{1x}}$$

$$N_{\eta_y} \ge N_{h_y} \log \frac{h_{ymax}}{h_{1y}}.$$

When the total number of samples after the log-stretch transformation in all three dimensions becomes very large, it may be cost-efficient to perform reconstruction separately for near and far offsets or for early and late times, thereby reducing the stretch factor $$\left(\text{given by } \log\frac{t_{max}}{t_1} * \log\frac{h_{xmax}}{h_{x1}} * \log\frac{h_{ymax}}{h_{y1}}\right).$$

The numerical implementation of the ISR DMO method of the present invention may suffer from edge effects at near offsets. These edge effects are a well-known issue encountered by most migration methods. In preferred embodiments of the present invention, this difficulty is circumvented by deriving an approximate method that can be used to process near offsets, which would be otherwise affected by the edge effects. It can be shown that if $$\left|\frac{4h}{Vt}\sin\beta\right| \ll 1,$$

where $\beta$ is the subsurface reflector dip, then $P_n(t, \vec{h}) \approx P_0(t, \vec{h}/2)$. In other words for small (relative to depth) offsets an approximate reconstruction can be performed by spatially stretching the input zero-offset shot $P_0(t_0, \vec{h}_0)$ by a factor of 2, which is also equivalent to assuming that the reflection point and the midpoint coincide. This assumption is completely accurate for flat ($\beta=0$) reflectors only. In the presence of dip, the timing error incurred by this approximate approach is proportional to $$\left|\frac{4h}{Vt}\sin\beta\right|^2.$$

In practice, it has been found that the approximate method works well for offsets as large as several hundred meters. Moreover, if the desired maximum output offset is small (i.e., limited to several hundred meters) or subsurface dips are known to be small in either x- or y-direction, or both, the approximate method can completely replace the more accurate ISR DMO in the selected direction. For example, 3D SRME may require long offsets (several kilometers) in the in-line direction, but only a limited range of cross-line offsets (several hundred meters) to be present in the output dataset. In this scenario, one could use the approximate method described above in the crossline direction in combination with an accurate 2D ISR DMO in the inline direction.

3D SRME

Figure 1:
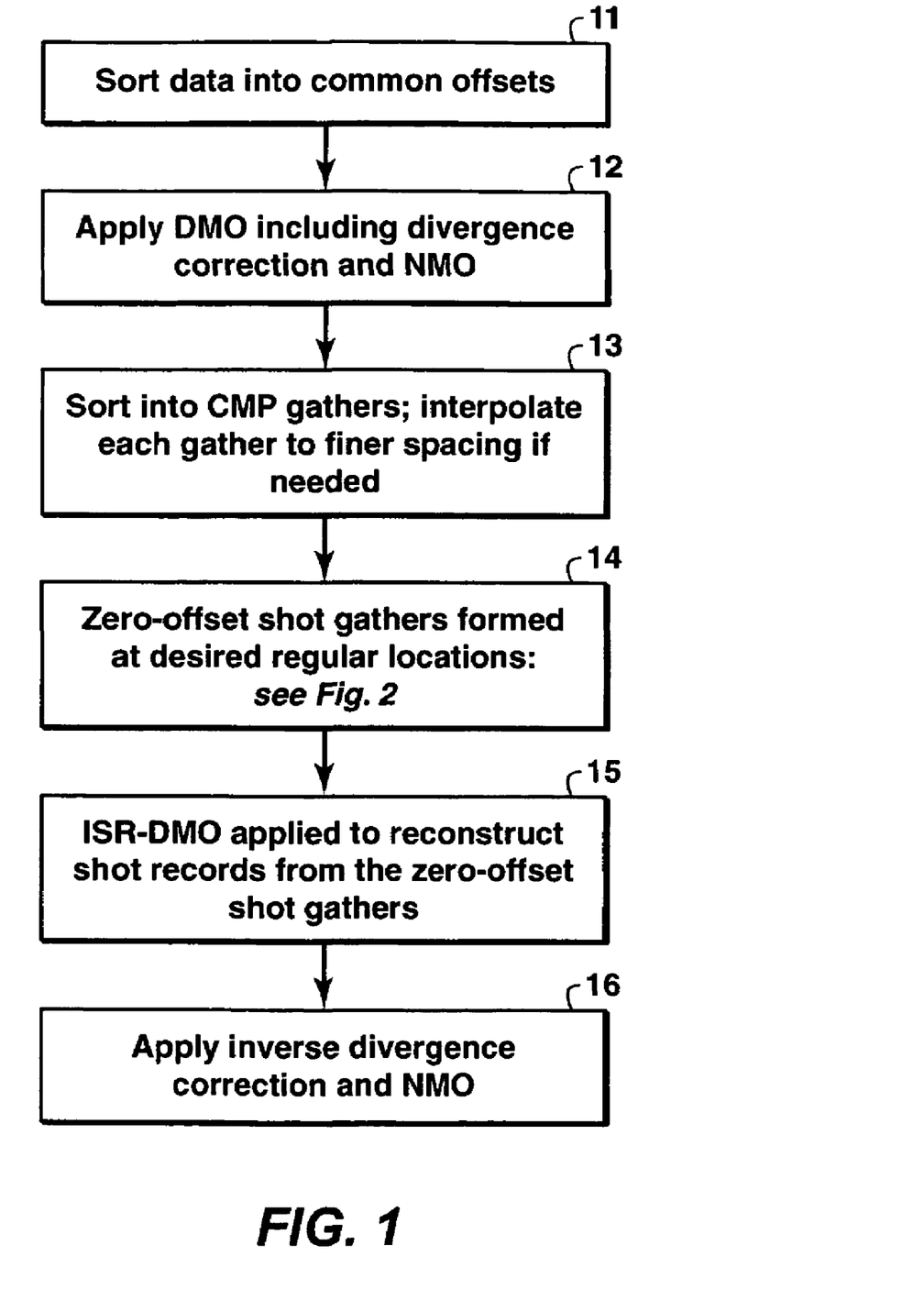
FIG. 1 is a flow chart of the basic steps of the present inventive method for interpolating seismic data to the desired regular, fine sampling.
Figure 5:
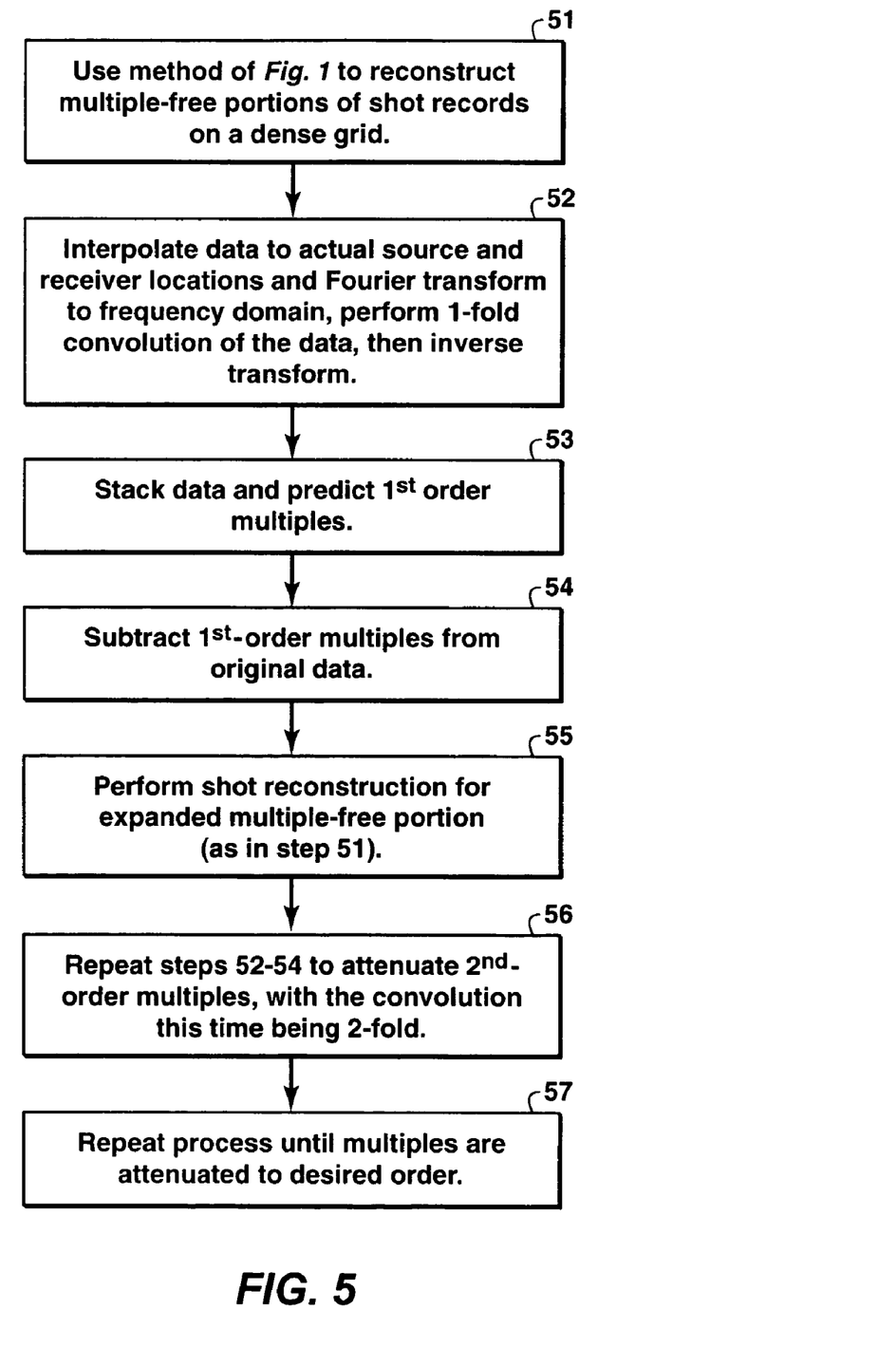
FIG. 5 is a flow chart illustrating the basic steps of an iterative method for using the data regularization features of the present invention for 3-D surface-related multiple elimination ("SRME")

A widely used approach to suppression of surface-related multiples is to perform 2.5-D SRME. In this technique, an approximate method (such as differential NMO) is used to perform data regularization. The key assumption in the 2.5-D SRME approach is that the subsurface does not vary in the cross-line direction. A description of this approach can be found in Hadidi, et. al, "Surface-related multiple elimination on wide-tow marine data," *The Leading Edge* 21, 787-790 (2002). SRME does not assume that the subsurface is laterally invariant, but the 3-D implementation requires additional information in order to predict multiples, namely a shot record at every surface location. The reconstruction technique of the present invention may be used to create the input necessary for 3-D SRME. Since the present inventive method is DMO-based, it is able to correctly reconstruct shot records in the multiple-free parts of the data only. Therefore, the iterative approach to 3-D SRME outlined in the flow-chart of FIG. 5 may be employed:

At step 51, the interpolation method described in FIG. 1, which may include the efficiency features of FIG. 4, is used to reconstruct shot records on a dense grid covering all locations where shots and receivers were present in the field. Significant cost savings can be realized if the reconstructed shot records are also Fourier-transformed from the time domain to the frequency domain (see step 52) before being saved to disk. Only the multiple-free portion of the data needs to be reconstructed in this step. Persons skilled in the art will know how to identify the multiple-free data and separate them.

At step 52, for each source-receiver pair, the results of step 51 are spatially interpolated to reconstruct shot records at the exact locations of the source and receiver. The two shot records, i.e., the record for the source location and the record for the receiver location, are then Fourier-transformed to the frequency domain (if not previously transformed before saving to disk). Then, co-located trace pairs from the reconstructed records at the source and receiver positions are multiplied sample by sample, and the results are inverse-Fourier-transformed back to the time domain. The skilled person in the art will recognize that the sample-by-sample multiplication in the Fourier transform domain is the well-known mathematical operation called convolution, or 1-fold convolution in this instance. Convolution is most conveniently carried out in the transform domain, but can be done in the time domain and the appended claims will be understood to include either approach.

At step 53, the data are stacked, thus generating a prediction of first-order surface related multiples. After stacking, the person skilled in the art will appreciate that one has a single seismic trace that consists of predicted surface-related multiples. Detailed treatment can be found in Dragoset, W. H. and Jericevic, Z., "Some remarks on surface multiple attenuation," *Geophysics*, Soc. of Expl. Geophys. 63, 772-789 (1998). At step 54, the predicted first order multiples are adaptively subtracted from the original data. Adaptive subtraction is a standard step in multiple attenuation. It involves shaping predicted multiples (generated in step 53) to better match actual multiples observed in the data. Various criteria can be used to define what constitutes a better match; for example, optimization can be performed to minimize the total amount of energy in the output seismic section. A good discussion can be found in Dragoset, B., "A practical approach to surface multiple attenuation," *The Leading Edge* 18, no. 1, 104-108 (1999).

At step 55, shot reconstruction is once again performed for the expanded multiple-free portion of the data, thus generating a prediction of second-order multiples. At step 56, the convolution (2-fold convolution in this instance) and stacking of steps 52 and 53 are repeated, and the predicted second-order multiples are adaptively subtracted. At step 57, the process is repeated as many times as necessary to handle higher-order multiples.

Figure 6:
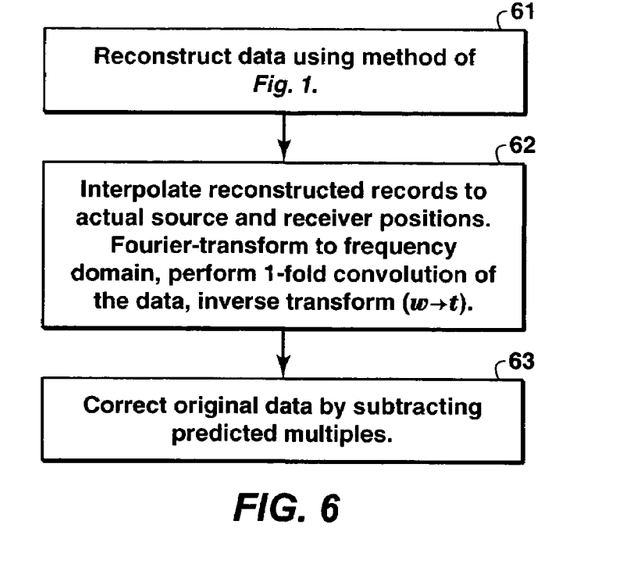
FIG. 6 is a flow chart of a low-cost, non-iterative surface-related multiple elimination method.

In an alternative embodiment of the present inventive method, a simplified non-iterative procedure can be used, as illustrated in the flow chart of FIG. 6. At step 61, the method of FIG. 1 is used to reconstruct the data, i.e., the complete data set combining the multiple-free and multiple-contaminated portions. Positioning of reconstructed multiples will not be entirely correct, but can be accepted as an approximation.

At step 62, for each source-receiver pair, the results of step 61 are spatially interpolated to reconstruct shot records at the exact locations of the source and receiver. After Fourier transformation to the frequency domain, the two shot records (source-receiver pair) are then multiplied sample by sample (1-fold convolution) and the result inverse-Fourier-transformed to the time domain and stacked, thus generating a prediction of multiples to all orders. At step 63, predicted multiples are adaptively subtracted from the original data.

Shot Record Migration

As the person skilled in the art will know, Shot Record Wave Equation Migration (SRWEM) applies the wave equation to forward-model an estimate of the seismic wave-field inside the earth associated with a seismic source location while simultaneously using the wave equation to backward-propagate and thereby extrapolate into the subsurface the recorded wave-field data associated with active receivers for that source location. An imaging condition is applied to estimate the earth's reflectivity in the subsurface using the extrapolated source and receiver wave-fields at each desired image location. The imaging condition can be as simple as a cross-correlation of the estimates of the source and receiver wave-fields at the desired image location in depth or as complicated as an inversion method that tries to estimate accurate amplitudes and phases for an estimate of angle-dependent reflectivity associated with different wave propagation modes using data from multiple shots while compensating for irregular surface acquisition. The SRWEM method simplifies greatly for regularly sampled input shot locations compared to that required to compensate for irregularly sampled input data. The cost is proportional to the number of shot records migrated and is almost independent of the number of traces per shot. Therefore, one embodiment of the present invention discloses a certain super shot gather as input data set for SRWEM. The super shot consists of a shot record with dense 360-degree receiver coverage that comprises information content equivalent to that of a large number of field shot records. The present inventive method can generate the regularly sampled shot records that are desirable for SRWEM.

Typical marine acquisition has shots spaced 25-50 meters apart in the inline directions. Each shot record may have 3000-4000 traces. The super-shot embodiment of the present invention reconstructs shots with 360-degree receiver coverage and 20,000-40,000 traces per shot record, but spaced 300-500 meters apart in the inline direction. In this manner, one is able to migrate less than one-fourth, possibly as few as one-tenth, of the number of shots that would otherwise need to be migrated. With the cost being directly proportional to the number of shots (and almost independent of the number of traces in each shot), this approach provides significant cost savings. Care must be taken not to space the shot records so far apart in the inline direction as to lead to aliasing distortion, especially if angle gathers are formed.

Current industry practice is to migrate a sub-sampled set of shot records (one-eighth or one-fourth or one-half of the input shots) with Shot Record Migration rather than migrate all the recorded shots, because of the expense of SRWEM. The resulting images do not benefit from all of the information in the originally acquired seismic data set and so have both signal-to-noise issues and data aliasing issues. The present inventive method can and preferably does use all of the originally recorded data to form reconstructed shots, each with a dense wide-aperture wide-azimuth receiver coverage thereby addressing both of the limitations associated with sub-sampling shots from the original acquisition. All of the originally acquired input data can be, and preferably are, used when migrating the reconstructed shots even while cost benefits are obtained as only a smaller number of reconstructed shots need to be migrated. Cost is almost proportional to the number of shots that are migrated and only slightly impacted by the number of traces per shot. In addition, the Shot Record Migration processing module may assume a regular input shot location geometry and therefore can be a less complicated algorithm than one that has to address data regularization issues associated with variations in a typical seismic acquisition.

EXAMPLES

1. Synthetic Data Example

Figure 7:
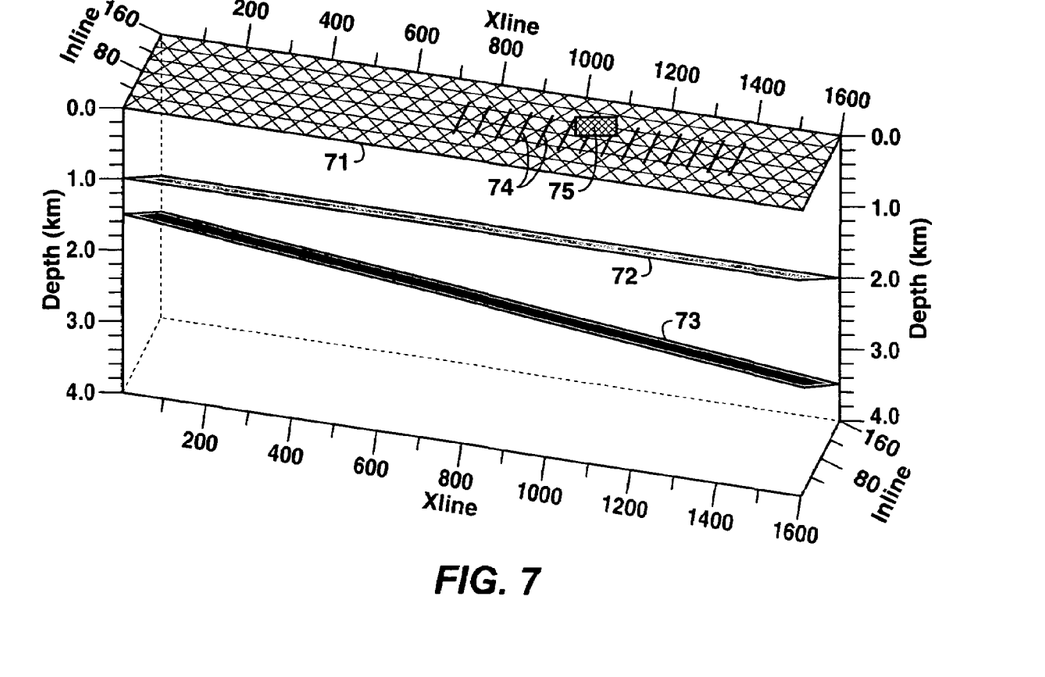
FIG. 7 shows a geologic model for a synthetic test of the present inventive method.
Figure 8:
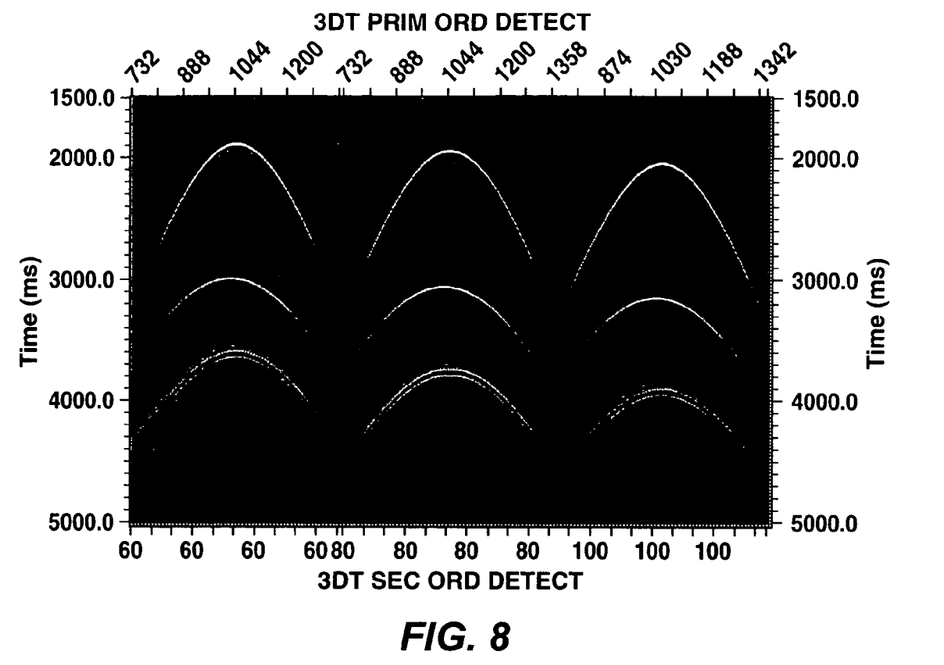
FIG. 8 shows the shot record for a synthetic shot positioned between two sail lines of the synthetic survey, as reconstructed by the present inventive method.
Figure 9:
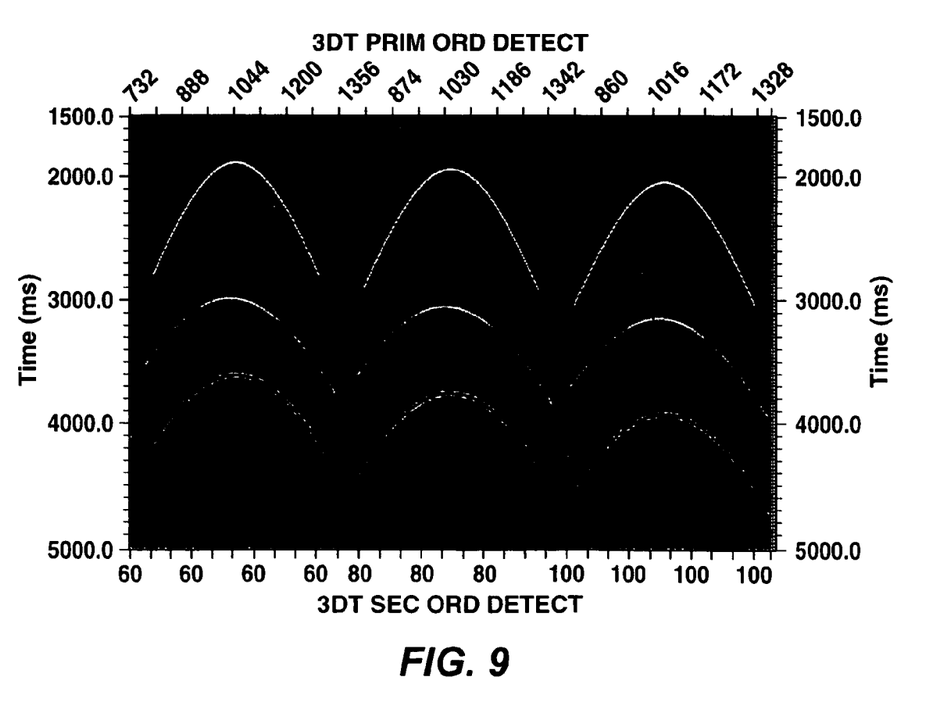
FIG. 9 shows a shot at the same in-between location as generated by the model (of FIG. 7) that generated the shot records in FIG. 8 for the shots on the sail line on either side.

The goal of this synthetic test was to reconstruct a shot in a position where it had not been originally "acquired" (modeled, since this is a synthetic example) and to compare it to a shot at the same position, modeled separately. Good agreement between the two results would validate the reconstruction method. In this example, a typical marine survey with 10 streamers and 2 sources was modeled. FIG. 7 illustrates the geologic model, which consists of the free surface 71, water bottom with cross-line dip 72, and one subsurface reflector 73 with both in-line and cross-line dips. Typical values were assigned for P-wave and S-wave velocities and for density in the different regions of the model. The reconstruction process described above was applied to synthesize a shot positioned at 75 between two of the original sail lines (not shown), and the results are shown in FIG. 8. A shot at exactly the same location with exactly the same receiver coverage 74 was then modeled directly (FIG. 9). In each figure, the series of three peaks higher on the time (depth) axis (lower values of time) represent the reflections from the water bottom 72 from three different receiver lines. The series of three peaks intermediate on the time axis represent the reflections from the subsurface reflector 73. The bottom (longest times) series of three peaks represent surface multiple reflections, the appearance of a deeper reflector being illusory. Comparing the positioning and particularly the depth of the two primary reflectors (water bottom 72 and subsurface reflector 73) between FIG. 8 and FIG. 9 shows them to be very similar, thereby validating the reconstruction technique. The agreement is not as close for the multiple reflections, which are unwanted noise and for which the present invention is not expected to work as well as stated previously.

Field Data Examples

Figure 10:
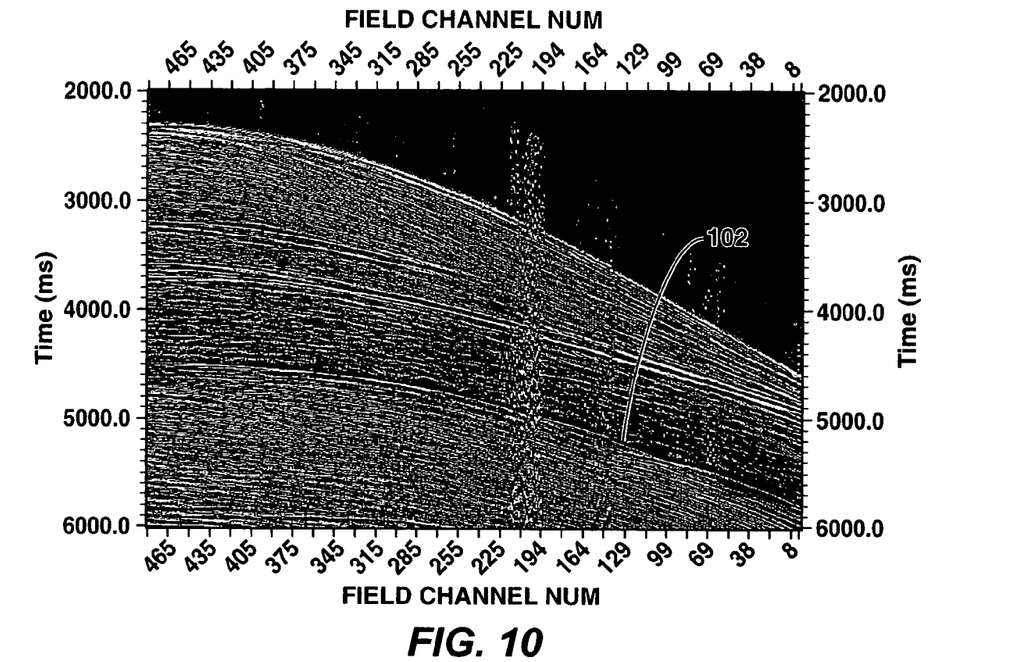
FIG. 10 shows an actual shot record contaminated by complex 3-D multiple reflections.
Figure 11:
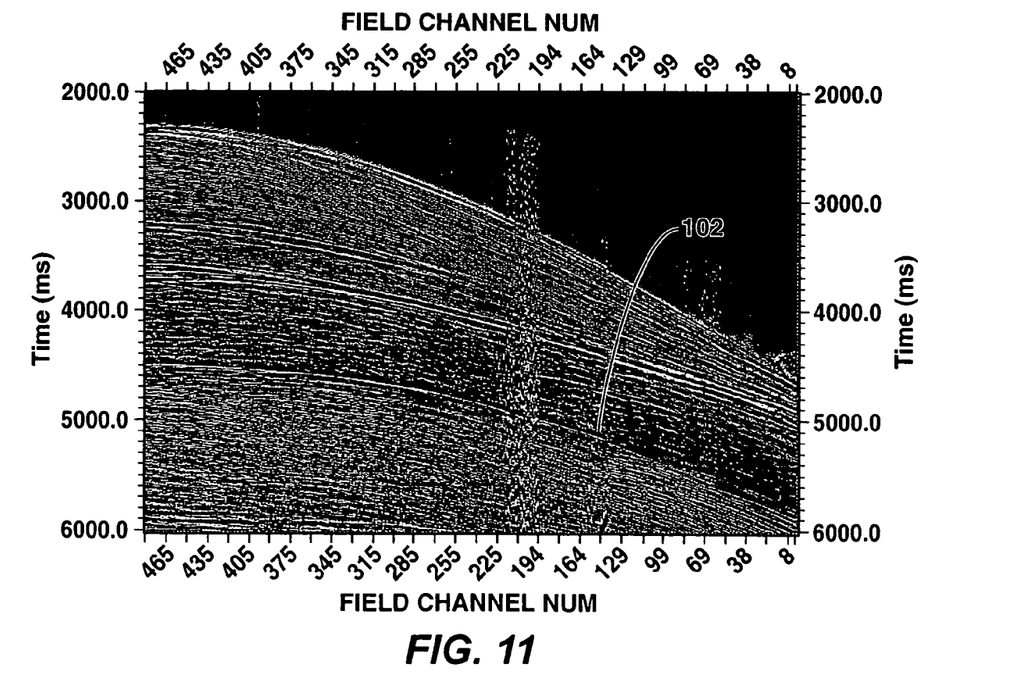
FIG. 11 shows the data of FIG. 10 after application of conventional 2.5-D SRME to predict and attenuate the multiples.
Figure 12:
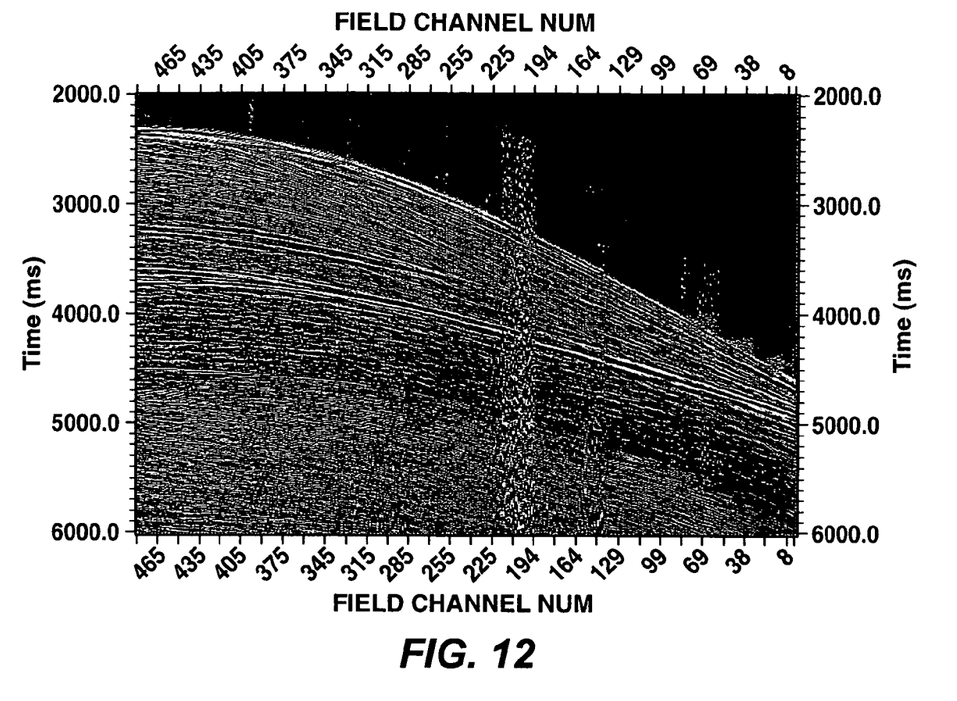
FIG. 12 shows the data of FIG. 10 after multiple attenuation by the 3-D method of the present invention.

The goal of the first field data test is to compare the performance of the conventional 2.5-D SRME and the new 3-D SRME approach. FIG. 10 shows a shot record contaminated by complex 3-D multiples. (What appears to be a different and lower-lying reflecting surface at 102 is actually the first-order water bottom multiple reflection.) FIG. 11 shows the same data after application of conventional 2.5-D SRME, which failed to predict and attenuate most multiples; e.g., the multiple at 102 is still readily observable. FIG. 12 shows the data of FIG. 10 after application of the 3-D SRME technique of the present inventive method, which was able to successfully predict and attenuate the 3-D multiples present in the data.

Figure 13:
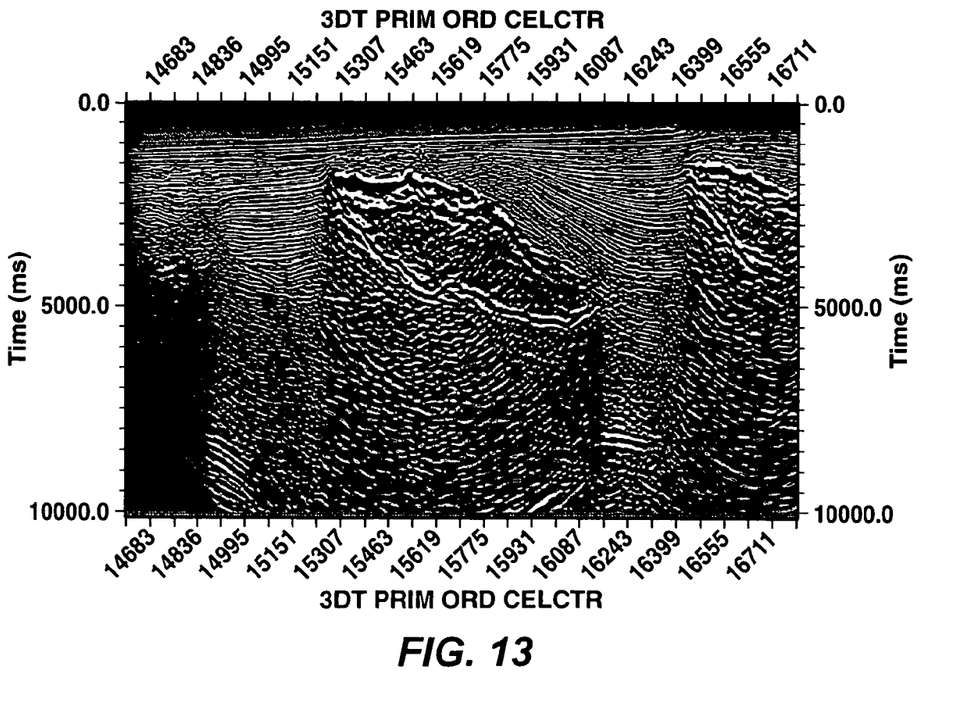
FIG. 13 shows shot record migration on actual field data using the present invention's super-shot technique.
Figure 14:
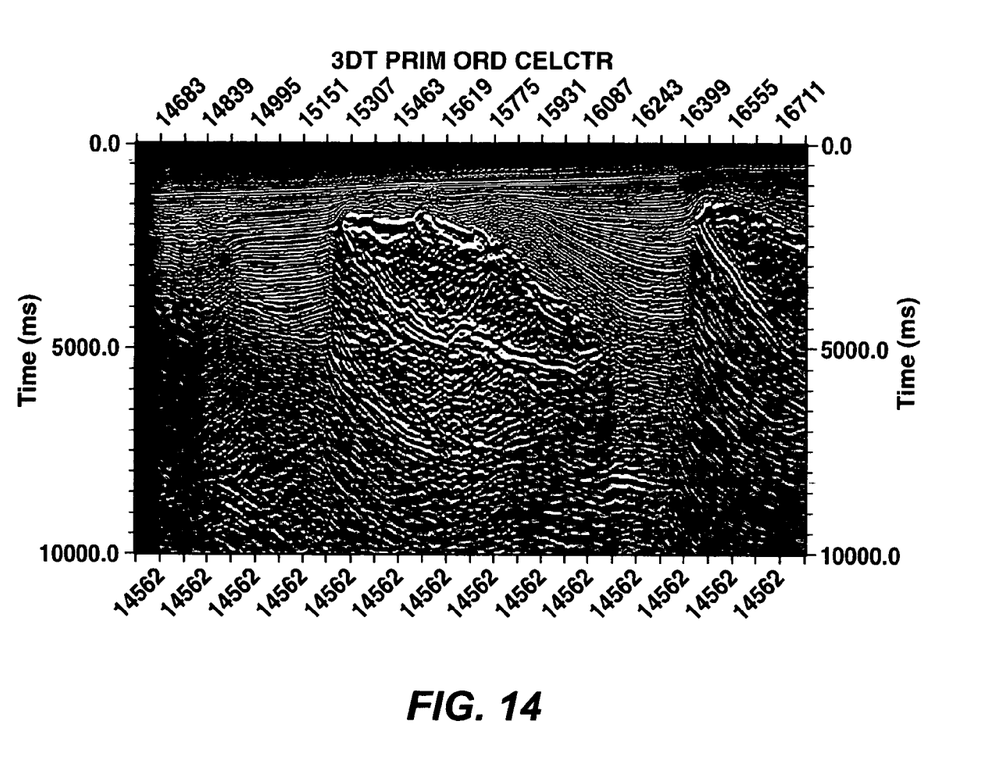
FIG. 14 shows the result of conventional shot record migration applied to the same field data.

In the second field data example, the reconstruction technique of the present inventive method was applied to obtain a small number of "super-shots" with dense 360-degree coverage, as described above in the section on shot record migration. SRWEM was then applied, and the results are shown in FIG. 13. For comparison, FIG. 14 shows the output of conventional SRWEM processing. There is excellent agreement in positioning of all key horizons in both sections. In this particular example, the cost of the present invention's super-shot approach was about four times less than the cost of a conventional approach in which every other shot was migrated.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

We claim:

1. A method for reconstructing shot records from a three-dimensional seismic survey, said method comprising:
   (a) sorting the seismic data into common-offset gathers;
   (b) DMO-processing (including divergence correction and normal moveout) the data to map the data to zero offset;
   (c) sorting the mapped data into common mid-point gathers;
   (d) applying temporal log-stretch and Fourier transforms to the common midpoint gathers;
   (e) forming input zero-offset shot gathers at desired locations for reconstructed shot gathers by selecting data traces from the common-midpoint gathers;
   (f) applying spatial log-stretching and Fourier transforms to the input zero-offset shot gathers;
   (g) designing an operator having a kinematics (shape) described by the following equations:

$$\{(2h_{0x}/h_x)-1\}^2+(t_0/t)^2=1$$

$$h_y=h_x h_{0y}/h_{0x}$$

where $t_0$ and $t$ are time, and $\vec{h}_0=(h_{0x},h_{0y})$ and $\vec{h}=(h_x,h_y)$ denote displacements (offsets) relative to shot location, for the input zero-offset shot record and the reconstructed shot record, respectively;
   (h) applying temporal and spatial log-stretch and Fourier transforms to said operator's impulse response;
   (i) multiplying the stretched and Fourier-transformed input zero-offset shot gathers by the stretched and Fourier-transformed impulse response, sample by sample;
   (j) inverse Fourier transforming and inverse log stretching the results from the previous step to produce reconstructed shot records; and
   (k) performing inverse normal moveout and inverse divergence compensation on the reconstructed shot records.

2. The method of claim 1, wherein each input zero-offset shot gather is formed by:
   (a) selecting a shot location in the desired reconstructed configuration;
   (b) selecting a location on a discretized grid selected for performing numerical implementation of said shot reconstruction method;
   (c) selecting a trace from the common-midpoint gather located at the selected grid location;
   (d) placing said selected trace at said selected grid location; and
   (e) repeating steps (b)-(d) for a pre-determined number of other grid locations.

3. The method of claim 2, wherein the selected trace has (original) offset equal to twice the distance between said selected shot location and said selected grid location.

4. The method of claim 1, further comprising interpolating said common-midpoint gathers to a predetermined finer offset spacing.

5. The method of claim 1, wherein said operator is described by the following formula:

$$P_n(t,\vec{h}) = \int\int e^{-i(\omega_n t - \vec{k}_h \vec{h})} d\omega_n d\vec{k}_h$$

$$\int\int e^{i(\omega_n t_n(t_0,\vec{h}_0) - \vec{k}_h \vec{h}_n(t_0,\vec{h}_0))} P_0(t_0,\vec{h}_0) J(\omega_n,\vec{k}_h;t_0,\vec{h}_0) dt_0 d\vec{h}_0$$

where $$\vec{h}_n = \frac{4\rho-2}{4\rho-1}\vec{h}_0;\ t_n = t_0 \frac{\rho}{\gamma}(1-2\rho);\ \gamma = \frac{\vec{k}_h \vec{h}_0}{\omega_n t_0};\ \rho\sqrt{1-4\rho}=\gamma$$

and where $P_0(t_0,\vec{h}_0)$ is an input zero-offset shot data record and $P_n(t,\vec{h})$ is a reconstructed shot record; $t_0$ and $t$ are input and output time respectively; $\vec{h}_0=(h_{0x},h_{0y})$ and $\vec{h}=(h_x,h_y)$ denote displacements (offsets) measured from the shot location for the input zero-offset shot and reconstructed shot records, respectively, and J is a weighting factor, said weighting factor being selected to preserve amplitude consistency between input and output data.

6. The method of claim 5, wherein said weighting factor is $$J = \frac{2\rho(1-2\rho)^2}{\gamma(1-6\rho)}.$$

7. The method of claim 1, wherein the log-stretch transformation is:

$$h_{0x} = h_{1x}\exp\frac{\eta_{0x}}{h_{1x}};\ h_{0y} = h_{1y}\exp\frac{\eta_{0y}}{h_{1y}}$$

$$h_x = h_{1x}\exp\frac{\eta_x}{h_{1x}};\ h_y = h_{1y}\exp\frac{\eta_y}{h_{1y}}$$

$$t = t_1\exp\frac{\tau}{t_1};\ t_0 = t_1\exp\frac{\tau_0}{t_1},$$

where $t_1$ and $\vec{h}_1$ are a predetermined minimum time and offset, respectively.

8. The method of claim 1, further comprising splitting the input zero-offset gathers into four quadrants in offset space before log-stretching and Fourier transforming, and then merging results from all four quadrants back into one after multiplying by the impulse response and inverse log stretching and inverse Fourier transforming.

9. The method of claim 5, wherein $P_0(t_0,\vec{h}_0)$ is set equal to $\delta(t_1-t_0,\vec{h}_1-\vec{h}_0)$ in the integral formula for $P_n(t,\vec{h};t_1,\vec{h}_1)$ before log-stretching and Fourier transformations.

10. The method of claim 1, wherein the log stretching transformations are performed by numerical methods involving dividing the seismic data volume into discrete cells called samples, said cells having dimensions $\Delta h_x$, $\Delta h_y$, and $\Delta t$, and wherein sampling requirements after the log stretch transformation are given by $$\Delta\tau \leq \frac{t_1}{t_{max}}\Delta t,$$

where $\Delta\tau$ is the sampling interval after the log-stretch transformation, and $t_1$ and $t_{max}$ are minimum and maximum times of interest, and by $$\Delta\eta_x \leq \frac{h_{1x}}{h_{\max x}}\Delta h_x \text{ and } \Delta\eta_y \leq \frac{h_{1y}}{h_{\max y}}\Delta h_y$$

where $h_{1x}$, $h_{1y}$, $h_{xmax}$ and $h_{ymax}$ are minimum and maximum offsets of interest, respectively.

11. The method of claim 5, further comprising spatially stretching the input zero-offset shot $P_0(t_0, \vec{h}_0)$ by a factor of 2 for offsets small compared to depth, thereby mitigating edge effects for near offsets.

12. The method of claim 1, wherein the Fourier transforms are Fast Fourier Transforms.

13. A method for suppressing surface-related multiple reflections in seismic data obtained from a three-dimensional seismic survey, said method using reconstructed shot records and comprising:
    (a) sorting the seismic data into common-offset gathers;
    (b) DMO-processing (including divergence correction and normal moveout) the data to map the data to zero offset;
    (c) sorting the mapped data into common mid-point gathers;
    (d) applying temporal log-stretch and Fourier transforms to the common mid-point gathers;
    (e) forming input zero-offset shot gathers at desired locations for reconstructed shot gathers by selecting data traces from the common-midpoint gathers;
    (f) applying spatial log-stretching and Fourier transforms to the input zero-offset shot gathers;
    (g) designing an operator having a kinematics (shape) described by the following equations:

$$\{(2h_{0x}/h_x)-1\}^2 + (t_0/t)^2 = 1$$

$$h_y = h_x h_{0y}/h_{0x}$$

where $t_0$ and $t$ are time, and $\vec{h}_0 = (h_{0x}, h_{0y})$ and $\vec{h} = (h_x, h_y)$ denote displacements (offsets) relative to shot location, for the input zero-offset shot record and the reconstructed shot record, respectively;
    (h) applying temporal and spatial log-stretch and Fourier transforms to said operator's impulse response;
    (i) multiplying the stretched and Fourier-transformed input zero-offset shot gathers by the stretched and Fourier-transformed impulse response, sample by sample;
    (j) inverse Fourier transforming and inverse log stretching the results from the previous step to produce reconstructed shot records;
    (k) performing inverse normal moveout and inverse divergence compensation on the reconstructed shot records;
    (l) interpolating the reconstructed shot records for each source-receiver pair to actual source and receiver locations, Fourier transforming to the frequency domain, multiplying the record for the source position by the record for the receiver position, sample by sample, transforming back to the time domain, and then stacking the results and predicting the multiple reflections therefrom; and
    (m) adaptively subtracting the predicted multiples from the seismic data.

14. The method of claim 13, wherein each input zero-offset shot gather is formed by:
    (a) selecting a shot location in the desired reconstructed configuration;
    (b) selecting a location on a discretized grid selected for performing numerical implementation of said shot reconstruction method;
    (c) selecting a trace from the common-midpoint gather located at the selected grid location;
    (d) placing said selected trace at said selected grid location; and
    (e) repeating steps (b)-(d) for a pre-determined number of other grid locations.

15. A method for suppressing surface-related multiple reflections in seismic data obtained from a three-dimensional seismic survey, said method using reconstructed shot records and comprising:
    (a) partitioning the seismic data into a multiple-free portion and a multiple-contaminated portion, and selecting the multiple-free portion;
    (b) sorting the multiple-free portion of the seismic data into common-offset gathers;
    (c) DMO-processing (including divergence correction and normal moveout) the data to map the data to zero offset;
    (d) sorting the mapped data into common mid-point gathers;
    (e) applying temporal log-stretch and Fourier transforms to the common mid-point gathers;
    (f) forming input zero-offset shot gathers at desired locations for reconstructed shot gathers by selecting data traces from the common-midpoint gathers;
    (g) applying spatial log-stretching and Fourier transforms to the input zero-offset shot gathers;
    (h) designing an operator having a kinematics (shape) described by the following equations:

$$\{(2h_{0x}/h_x)-1\}^2 + (t_0/t)^2 = 1$$

$$h_y = h_x h_{0y}/h_{0x}$$

where $t_0$ and $t$ are time, and $\vec{h}_0 = (h_{0x}, h_{0y})$ and $\vec{h} = (h_x, h_y)$ denote displacements (offsets) relative to shot location, for the input zero-offset shot record and the reconstructed shot record, respectively;
    (i) applying temporal and spatial log-stretch and Fourier transforms to said operator's impulse response;
    (j) multiplying the stretched and Fourier-transformed input zero-offset shot gathers by the stretched and Fourier-transformed impulse response, sample by sample;
    (k) inverse Fourier transforming and inverse log stretching the results from the previous step to produce reconstructed shot records;
    (l) performing inverse normal moveout and inverse divergence compensation on the reconstructed shot records;
    (m) interpolating the reconstructed shot records for each source-receiver pair to actual source and receiver locations, Fourier-transforming to the frequency domain, multiplying the record for the source position by the record for the receiver position, sample by sample, Fourier-transforming back to the time domain, and then stacking the results and predicting multiple reflections therefrom;
    (n) adaptively subtracting the predicted multiples from the seismic data; and
    (o) taking the multiple-attenuated data from the preceding step and repeating steps (a)-(o) until multiples have been removed to a predetermined order.

16. The method of claim 15, wherein each input zero-offset shot gather is formed by:
    (a) selecting a shot location in the desired reconstructed configuration;

(b) selecting a location on a discretized grid selected for performing numerical implementation of said shot reconstruction method;

(c) selecting a trace from the common-midpoint gather located at the selected grid location;

(d) placing said selected trace at said selected grid location; and (e) repeating steps (b)-(d) for a pre-determined number of other grid locations.

17. The method of claim 1, further comprising using the reconstructed shot records to perform Shot Record Wave Equation Migration.

18. The method of claim 1, wherein the DMO processing is Equalized DMO.

19. A method for performing Shot Record Wave Equation Migration on three-dimensional seismic data, said method comprising:

(a) reconstructing the seismic data to produce shot records with receivers at densely spaced locations arranged with 360 degree coverage in the near vicinity of a comparative few super-shot locations, such that the number of reconstructed shot locations is less than 25% of the actual number of shot locations represented by said seismic data; and (b) performing Shot Record Wave Equation Migration on the reconstructed shot records.

20. The method of claim 19, wherein the reconstructing of the seismic data to produce reconstructed shot records is performed by a method comprising:

(a) sorting the seismic data into common-offset gathers;

(b) DMO-processing (including divergence correction and normal moveout) the data to map the data to zero offset;

(c) sorting the mapped data into common mid-point gathers;

(d) applying temporal log-stretch and Fourier transforms to the common mid-point gathers;

(e) forming input zero-offset shot gathers at desired locations for reconstructed shot gathers by selecting data traces from the common-midpoint gathers;

(f) applying spatial log-stretching and Fourier transforms to the input zero-offset shot gathers;

(g) designing an operator having a kinematics (shape) described by the following equations:

$$\{(2h_{0x}/h_x)-1\}^2 + (t_0/t)^2 = 1$$

$$h_y = h_x h_{0y}/h_{0x}$$

where $t_0$ and $t$ are time, and $\vec{h}_0 = (h_{0x}, h_{0y})$ and $\vec{h} = (h_x, h_y)$ denote displacements (offsets) relative to shot location, for the input zero-offset shot record and the reconstructed shot record, respectively;

(h) applying temporal and spatial log-stretch and Fourier transforms to said operator's impulse response;

(i) multiplying the stretched and transformed input zero-offset shot gathers by the stretched and transformed impulse response, sample by sample;

(j) inverse Fourier transforming and inverse log stretching the results from the previous step to produce reconstructed shot records; and (k) performing inverse normal moveout and inverse divergence compensation on the reconstructed shot records.

21. A method for reconstructing shot records from a three-dimensional seismic survey, said method comprising:

(a) sorting the seismic data into common-offset gathers;

(b) DMO-processing (including divergence correction and normal moveout) the data to map the data to zero offset;

(c) sorting the mapped data into common mid-point gathers;

(d) forming input zero-offset shot gathers at desired locations for reconstructed shot gathers by selecting data traces from the common-midpoint gathers;

(e) designing an operator having a kinematics (shape) described by the following equations:

$$\{(2h_{0x}/h_x)-1\}^2 + (t_0/t)^2 = 1$$

$$h_y = h_x h_{0y}/h_{0x}$$

where $t_0$ and $t$ are time, and $\vec{h}_0 = (h_{0x}, h_{0y})$ and $\vec{h} = (h_x, h_y)$ denote displacements (offsets) relative to shot location, for the input zero-offset shot record and the reconstructed shot record, respectively;

(f) applying said operator to the input zero-offset shot gathers to generate reconstructed shot records; and (g) performing inverse normal moveout and inverse divergence compensation on the reconstructed shot records.

22. The method of claim 21, wherein applying said operator to the input zero-offset shot gathers comprises:

(i) applying temporal log-stretch and Fourier transforms to the common mid-point gathers;

(ii) applying spatial log-stretching and Fourier transforms to the input zero-offset shot gathers;

(iii) applying temporal and spatial log-stretch and Fourier transforms to said operator's impulse response;

(iv) multiplying the stretched and Fourier-transformed input zero-offset shot gathers by the stretched and Fourier-transformed impulse response, sample by sample; and (v) inverse Fourier transforming and inverse log stretching the results from the previous step to produce reconstructed shot records.

23. The method of claim 22, wherein the log-stretch transformation is:

$$h_{0x} = h_{1x}\exp\frac{\eta_{0x}}{h_{1x}}; \quad h_{0y} = h_{1y}\exp\frac{\eta_{0y}}{h_{1y}}$$

$$h_x = h_{1x}\exp\frac{\eta_x}{h_{1x}}; \quad h_y = h_{1y}\exp\frac{\eta_y}{h_{1y}}$$

$$t = t_1\exp\frac{\tau}{t_1}; \quad t_0 = t_1\exp\frac{\tau_0}{t_1},$$

where $t_1$ and $\vec{h}_1$ are a predetermined minimum time and offset, respectively.

* * * * *